(12) United States Patent
Rao et al.

(10) Patent No.: US 9,514,559 B2
(45) Date of Patent: *Dec. 6, 2016

(54) MEMORY SHARING VIA A UNIFIED MEMORY ARCHITECTURE

(71) Applicant: Intel Corporation, Santa Clara, CA (US)

(72) Inventors: Jayanth N. Rao, Folsom, CA (US); Murali Sundaresan, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/080,145

(22) Filed: Mar. 24, 2016

(65) Prior Publication Data

US 2016/0203580 A1    Jul. 14, 2016

Related U.S. Application Data

(63) Continuation of application No. 13/588,453, filed on Aug. 17, 2012, now Pat. No. 9,373,182.

(51) Int. Cl.
```
G06F 15/16      (2006.01)
G06T 11/60      (2006.01)
G06F 12/00      (2006.01)
G06T 1/60       (2006.01)
G06F 12/10      (2016.01)
```

(52) U.S. Cl.
CPC .............. *G06T 11/60* (2013.01); *G06F 12/00* (2013.01); *G06F 12/109* (2013.01); *G06T 1/60* (2013.01); *G06F 12/1081* (2013.01); *G06F 2212/656* (2013.01); *Y02B 60/1225* (2013.01)

(58) Field of Classification Search
None
See application file for complete search history.

(56) References Cited

U.S. PATENT DOCUMENTS

| 2003/0210248 A1 | 11/2003 | Wyatt |
| 2010/0045682 A1 | 2/2010 | Ford et al. |

(Continued)

FOREIGN PATENT DOCUMENTS

| JP | H01291343 | 11/1989 |
| JP | H08328994 | 12/1996 |

(Continued)

OTHER PUBLICATIONS

International Search Report and Written Opinion received for PCT Patent Application No. PCT/US2013/045657, mailed on Apr. 24, 2014, 11 Pages.

(Continued)

*Primary Examiner* — Xiao Wu
*Assistant Examiner* — Mohammad H Akhavannik
(74) *Attorney, Agent, or Firm* — Blakely, Sokoloff, Taylor & Zafman LLP

(57) ABSTRACT

A method and system for sharing memory between a central processing unit (CPU) and a graphics processing unit (GPU) of a computing device are disclosed herein. The method includes allocating a surface within a physical memory and mapping the surface to a plurality of virtual memory addresses within a CPU page table. The method also includes mapping the surface to a plurality of graphics virtual memory addresses within an I/O device page table.

23 Claims, 8 Drawing Sheets

(56) References Cited

U.S. PATENT DOCUMENTS

| | | |
|---|---|---|
| 2010/0118041 A1 | 5/2010 | Chen et al. |
| 2011/0153957 A1 | 6/2011 | Gao et al. |
| 2011/0161619 A1 | 6/2011 | Kaminski et al. |
| 2014/0040565 A1 | 2/2014 | Asaro et al. |
| 2014/0040593 A1 | 2/2014 | Sharp et al. |

FOREIGN PATENT DOCUMENTS

| | | |
|---|---|---|
| JP | 2008-009982 | 1/2008 |
| WO | WO-2014/028109 | 2/2014 |

OTHER PUBLICATIONS

Shinji Shioda, "Exploring a technology of a new generation key processor, detailed explanation, Sandy Bridge Architecture," Monthly ASCII. Technologies, Japan, ASCII Media Works Co., Ltd., Feb. 24, 2011, vol. 16, No. 4, p. 28-35.
Notice of Reasons for Rejection from Counterpart JP Patent Application No. 2015-527456, Mailed Mar. 1, 2016, 3 pages.

400

MEMORY SHARING VIA A UNIFIED MEMORY ARCHITECTURE

CROSS REFERENCE TO RELATED APPLICATIONS

The present patent application is a continuation application claiming priority from U.S. application Ser. No. 13/588,453, filed Aug. 17, 2012 and is currently pending.

TECHNICAL FIELD

The present invention relates generally to the sharing of memory between a central processing unit (CPU) and an input/output (I/O) device within a computing system. More specifically, the present invention relates to the sharing of physical memory between a CPU and an I/O device.

BACKGROUND ART

Modern I/O devices may include computer processing capabilities that rival the computer processing capabilities of many central processing units (CPUs). As a result, a portion of the computational tasks traditionally performed by the CPU may be offloaded to an I/O device of the computing device. For example, an I/O device such as a graphics processing unit (GPU) of a computing device can perform some of the tasks traditionally performed by the CPU, thereby increasing the efficiency of the CPU.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
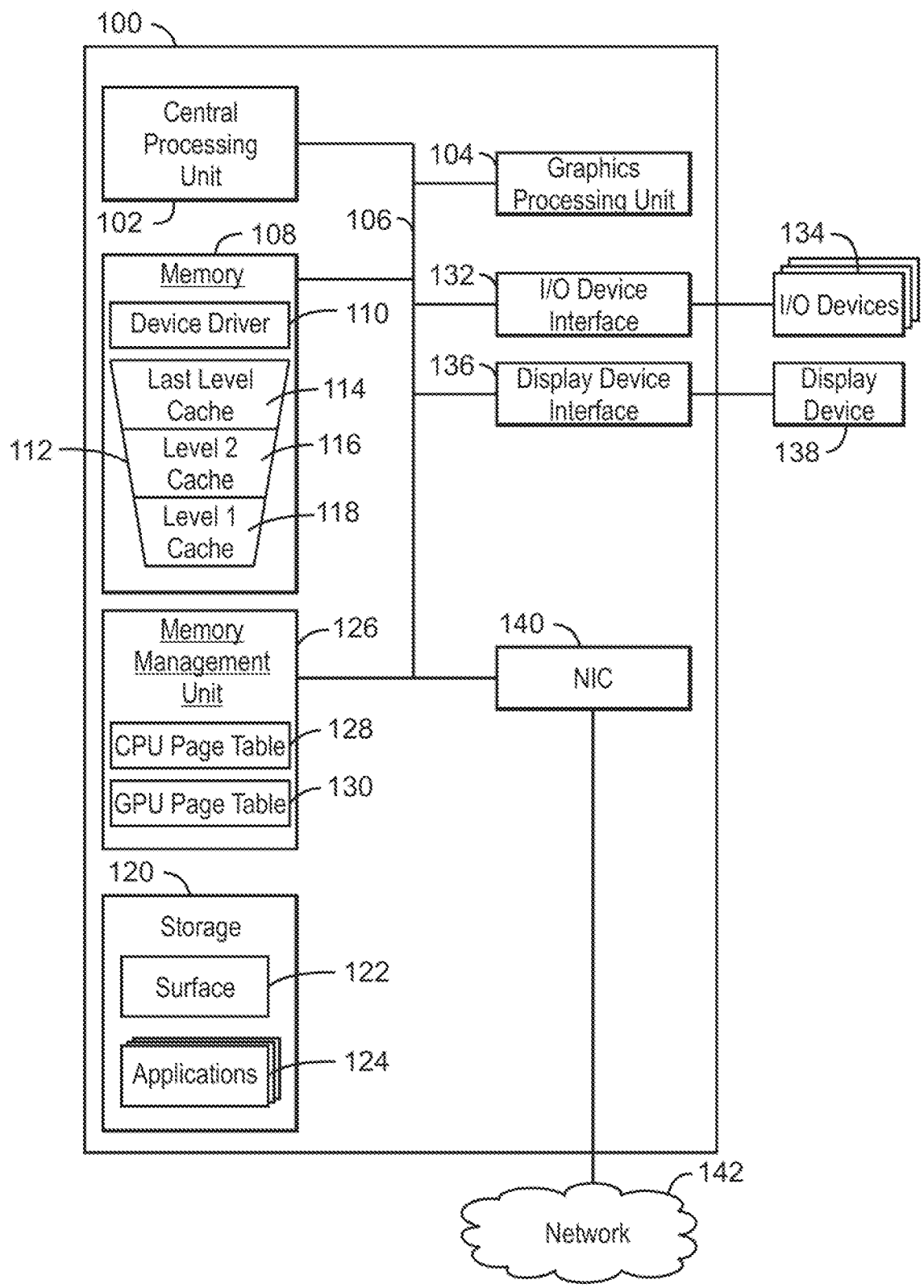
FIG. 1 is a block diagram of a computing device that may be used in accordance with embodiments.

Current operating systems and graphics interfaces manage GPUs as I/O devices, rather than managing the GPUs as processors with resources similar to CPUs. By managing GPUs as I/O devices, CPUs and GPUs have physical memories with separate physical address domains. When offloading computational tasks to the GPUs, data is copied from the physical address domain of the CPU to the physical address domain of the GPU. After the GPU has finished processing, the data is copied back to the physical address domain of the CPU.

Offloading a portion of the computational tasks traditionally performed by the CPU to the GPU of a computing device may increase the efficiency of the CPU. As discussed above, in order to offload tasks to the GPU, data may be transferred between the physical memory of the CPU to the physical memory of the GPU. The data transfers that occur when offloading computational tasks to the GPU may reduce any efficiency gained by offloading tasks to the GPU. Accordingly, embodiments described herein relate to the sharing of memory between the CPU and the GPU of a computing device. The memory may be shared via a unified memory architecture (UMA).

In various embodiments, the UMA provides for memory sharing between the CPU and GPU by providing both the CPU and the GPU with the same physical memory. Thus, the physical memory and the corresponding physical address space of the CPU and GPU are one and the same. In embodiments, the physical memory may be partitioned between the CPU and the GPU. Further, the physical memory can be a paged system memory that is allocated by the operating system of the computing device. The virtual memory address space of the CPU may be mapped to the same physical memory pages as the graphics virtual memory address space of the GPU. Additionally, in some embodiments, the CPU and GPU are physically located on the same die. Thus, the CPU and the GPU may share the data contained within the physical memory without copying data from the address space of the GPU to the address space of the CPU, or vice versa. This may reduce the cost of offloading computational tasks from the CPU to the GPU by, for example, decreasing the time and the power consumption for sharing data between the CPU and the GPU.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of a computing device 100 that may be used in accordance with embodiments. The computing device 100 may be, for example, a laptop computer, desktop computer, tablet computer, mobile device, or server, among others. The computing device 100 may include a central processing unit (CPU) 102 that is adapted to execute stored instructions, as well as a memory device 108 that stores instructions that are executable by the CPU 102. The CPU 102 can be a single core processor, a multi-core processor, a computing cluster, or any number of other configurations. Furthermore, the computing device 100 may include more than one CPU 102. The instructions that are executed by the CPU 102 may be used to implement a memory sharing procedure.

The computing device 100 may also include a graphics processing unit (GPU) 104. The GPU is an input/output (I/O) device within the computing device 100. An I/O device is a device that can be used to communicate with a computer using input, output, or any combination thereof. As shown, the CPU 102 may be connected through a bus 106 to the GPU 104. However, in some embodiments, the GPU 104 is located on the same die as the CPU 102 within the computing device 100. In this manner, the CPU 102 and the GPU are physically connected in such a manner that the connection between the CPU 102 and the GPU 104 via the bus 106 may be eliminated. Furthermore, in embodiments, the CPU 102 and the GPU 104 may be included within a unified memory architecture of the computing device 100, as discussed with respect to FIG. 2.

The GPU 104 may be configured to perform any number of graphics operations within the computing device 100. For example, the GPU 104 may be configured to render or manipulate graphics images, graphics frames, videos, or the like, to be displayed to a user of the computing device 100. In some embodiments, the GPU 104 includes a number of graphics engines (not shown), wherein each graphics engine is configured to perform specific graphics tasks, or to execute specific types of workloads.

The computing device 100 may also include a memory device 108. The memory device 108 can include random access memory (RAM), read only memory (ROM), flash memory, or any other suitable memory systems. For example, the memory device 108 may include dynamic random access memory (DRAM). The memory 108 may include a device driver 110 that is configured to execute the instructions for implementing the memory sharing procedure. The device driver 110 may be software, an application program, application code, or the like. In some embodiments, the device driver 110 is a user mode driver.

The memory 108 also includes a multi-level 112 cache that includes a last level cache (LLC) 114, a level 2 cache 116, and a level 1 cache 118. Although a multi-level cache 112 is used for illustration, any cache can be included in the computing device 100. The multi-level cache 112 may be a smaller, faster memory that stores a smaller subset of frequently used data for the CPU 102. A larger data set may be stored in a storage 120. The storage 120 is a physical memory such as a hard drive, an optical drive, a thumbdrive, an array of drives, or any combinations thereof. The storage 120 may also include remote storage drives. The amount of time for the CPU 102 to access data stored in the storage 120 may be slower relative to the amount of time it takes for the CPU 102 to access the multi-level cache 112 in the memory 104.

In some embodiments, the LLC 114 is shared between the CPU 102 and the GPU 104, while the level 2 cache 116 and the level 1 cache 118 may be hidden from the GPU 104 such that the GPU 104 cannot directly access data cached in the level 2 cache 116 and the level 1 cache 118. However, the LLC 114 can read and write data stored in the level 2 cache 116 and the level 1 cache 118. Thereby, when the GPU 104 requests data cached in the level 2 cache 116 or the level 1 cache 118, the LLC 114 is able to retrieve data from the level 2 cache 116 and the level 1 cache 118 for processing by the GPU 104. In this manner, the LLC 114 ensures data coherency within the computing device 100. As used herein, coherency refers to the state wherein the data being accessed by the CPU 102 and the GPU 104 is the same. Accordingly, the CPU 102 will ensure that data from the storage device 120 is accurately reflected in the LLC 114, the level 2 cache 116, and the level 1 cache 118 by ensuring the data is coherent with the LLC 114 in order to enable the correct data to be shared with the GPU 104.

Additionally, in embodiments, the CPU and GPU can access any level of memory. However, data from other levels of memory may be stale, while the LLC 114 includes the most recent data. Furthermore, in embodiments, the CPU and GPU can employ any mutually accessible storage location to perform shared virtual memory. Any mutually accessible storage location may include, but is not limited to, any area of the memory device 104, any area of the storage 120, a networked storage location, a thumbdrive, or any combination thereof.

The storage 120 includes a surface 122 as well as any number of applications 124 that are configured to run on the computing device 100. The surface 122 is a designated portion of physical memory that is allocated by the device driver 110. The surface may be updated based on processing performed on the contents of the physical memory within the surface 122. In embodiments, when an application 124 is executed by CPU 104, the application 124 may request that a surface be allocated by the device driver 110. Furthermore, the applications 124 running on the CPU 102 may configure the surface 122 depending on the memory allocation called for by the applications 124 by specifying the desired size and characteristics of the surface 122. Additionally, surface allocation may be performed, for example, in response to input from the CPU 102 of the computing device 100. Furthermore, in embodiments, the surface is marked as LLC cacheable. By designated the surface 122 as LLC cacheable, the data cached from locations within the surface 122 may be cached to the LLC 114, and thereby accessible in the LLC by both the CPU 102 and the GPU 104.

A memory management unit (MMU) 126 may be used to manage access to data that is stored within the surface 122. The MMU 126 can divide the virtual address space of the CPU 102 and the GPU 104 into various pages of address space. The CPU 102 and the GPU 104 each have their own virtual address spaces. The virtual address space allows for protection of the data contained within the surface 122 by isolating the various applications 124 executing within a computing system to a particular subset of virtual addresses. Through the use of virtual address spaces, one application 124 will not access the data of another application 124. Accordingly, the MMU 126 includes a CPU page table 128 and a GPU page table 130. The CPU page table contains the virtual addresses of the CPU mapped to a physical address location within the surface 122. Similarly, the GPU page table contains the virtual addresses of the GPU mapped to a physical address location within the surface 122. In the memory sharing procedure described herein, the CPU page table 128 may include a mapping of the CPU virtual address space to a physical address space. The physical address space corresponds to physical locations within the surface 122. Likewise, the GPU page table 130 may include a mapping of the GPU virtual address space to the same.

In various embodiments, the virtual memory addresses from the CPU page table 128 and the graphics virtual memory addresses from the GPU page table 130 are mapped to the physical memory pages of the surface 122 via a translation procedure. The translation procedure may be used to convert any of the virtual memory addresses to a corresponding physical address. For example, the translation procedure may be performed via a page table walk, which may be performed based on a specific translation table for converting virtual memory addresses within a page table to physical memory addresses within the page table. Additionally, in embodiments, a translation look-aside buffer may be used to translate the virtual addresses of the CPU and the GPU into physical address spaces within their respective page tables.

After a translation procedure has been performed, the surface 122 may be pinned. Pinning the surface refers to protecting the surface so that the physical locations and the corresponding physical addresses are unchanged. Thus, pinning the surface 122 ensures a "hard" mapping between virtual address spaces and physical address spaces. The hard mapping between address spaces is a mapping that does not change after the surface has been pinned. If the surface is not pinned, a page fault may be generated, or the wrong data may be processed as the physical location of the surface may shift.

In embodiments, an application 124 may execute on the CPU 102, and requests a surface, such as the surface 122, in order to perform the operations, such as processing data. The CPU 102 may handoff the operations to the GPU 104. Since the page tables have been mapped to the surface 122, the GPU can begin immediate execution of the operations that have been offloaded by the CPU 102 by accessing the surface, without copying data over to another address space. When the operations are completed by the CPU 102, the GPU 104 may signal to the CPU 122 that the operations are complete. The CPU 102 may then continue processing the data, without copying the data back to an original address space.

When the operations that are requested by the application 124 are performed by the GPU 104, modifications to the surface 122 may occur. According to the memory sharing procedure described herein, such modifications to the surface 122 are fully visible to the CPU 102. Thus, data may be shared between the GPU 104 and the CPU 102 without copying the data from the GPU 104 to the CPU 102, or vice versa.

The CPU 102 may be connected through the bus 106 to an input/output (I/O) device interface 132 adapted to connect the computing device 100 to one or more I/O devices 134. The I/O devices 134 may include, for example, a keyboard and a pointing device, wherein the pointing device may include a touchpad or a touchscreen, among others. The I/O devices 134 may be built-in components of the computing device 100, or may be devices that are externally connected to the computing device 100.

The CPU 102 may also be linked through the bus 106 to a display interface 136 adapted to connect the computing device 100 to a display device 138. The display device 138 may include a display screen that is a built-in component of the computing device 100. The display device 138 may also include a computer monitor, television, or projector, among others, that is externally connected to the computing device 100.

A network interface controller (NIC) 140 may be adapted to connect the computing device 100 through the bus 106 to a network 142. The network 142 may be a wide area network (WAN), local area network (LAN), or the Internet, among others.

The block diagram of FIG. 1 is not intended to indicate that the computing device 100 is to include all of the components shown in FIG. 1. Further, the computing device 100 may include any number of additional components not shown in FIG. 1, depending on the details of the specific implementation.

Figure 2A:
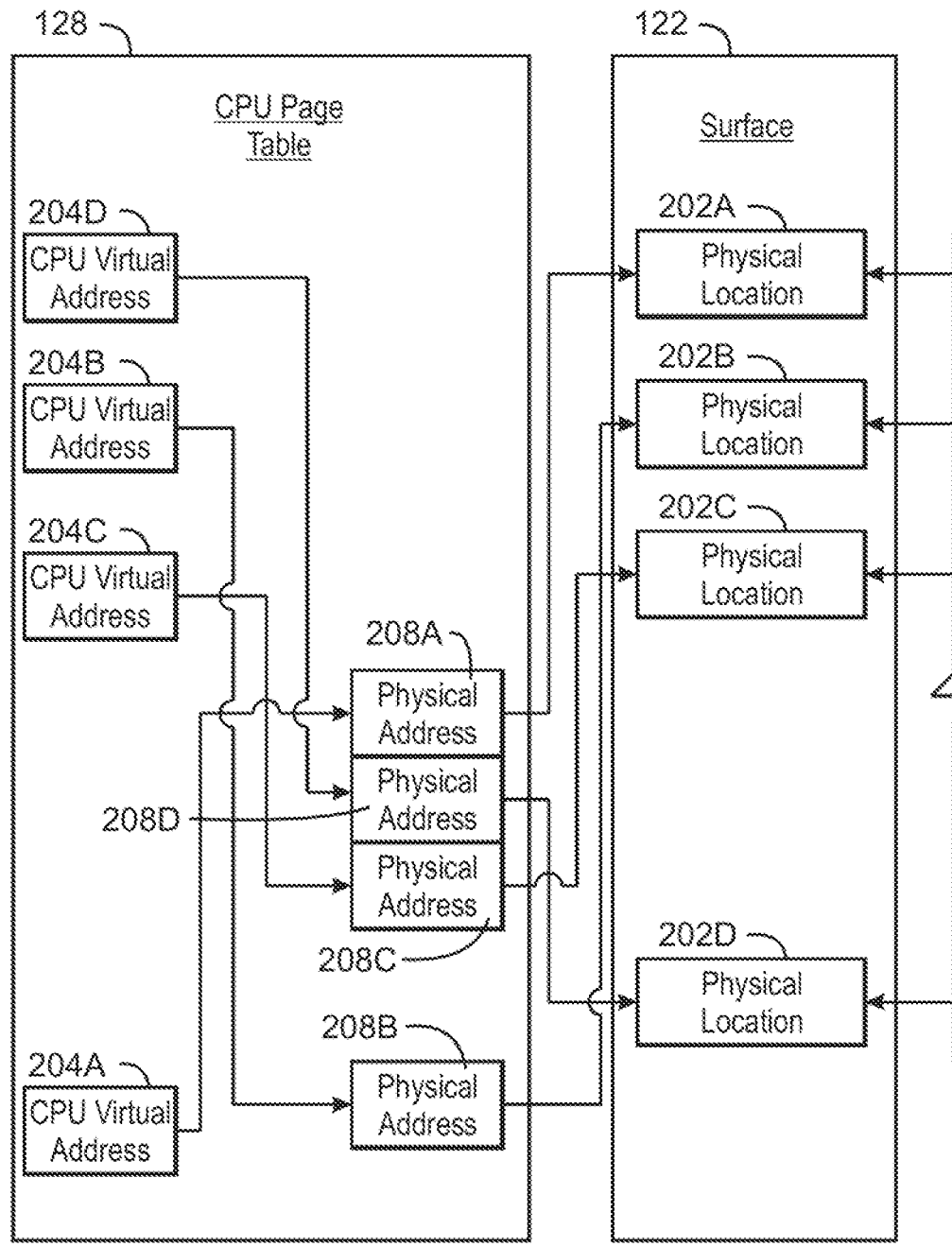
FIGS. 2A and 2B are a schematic of a unified memory architecture (UMA) that may be used to implement a procedure for sharing memory between the central processing unit (CPU) and the graphics processing unit (GPU) of the computing device, in accordance with embodiments.
Figure 2B:
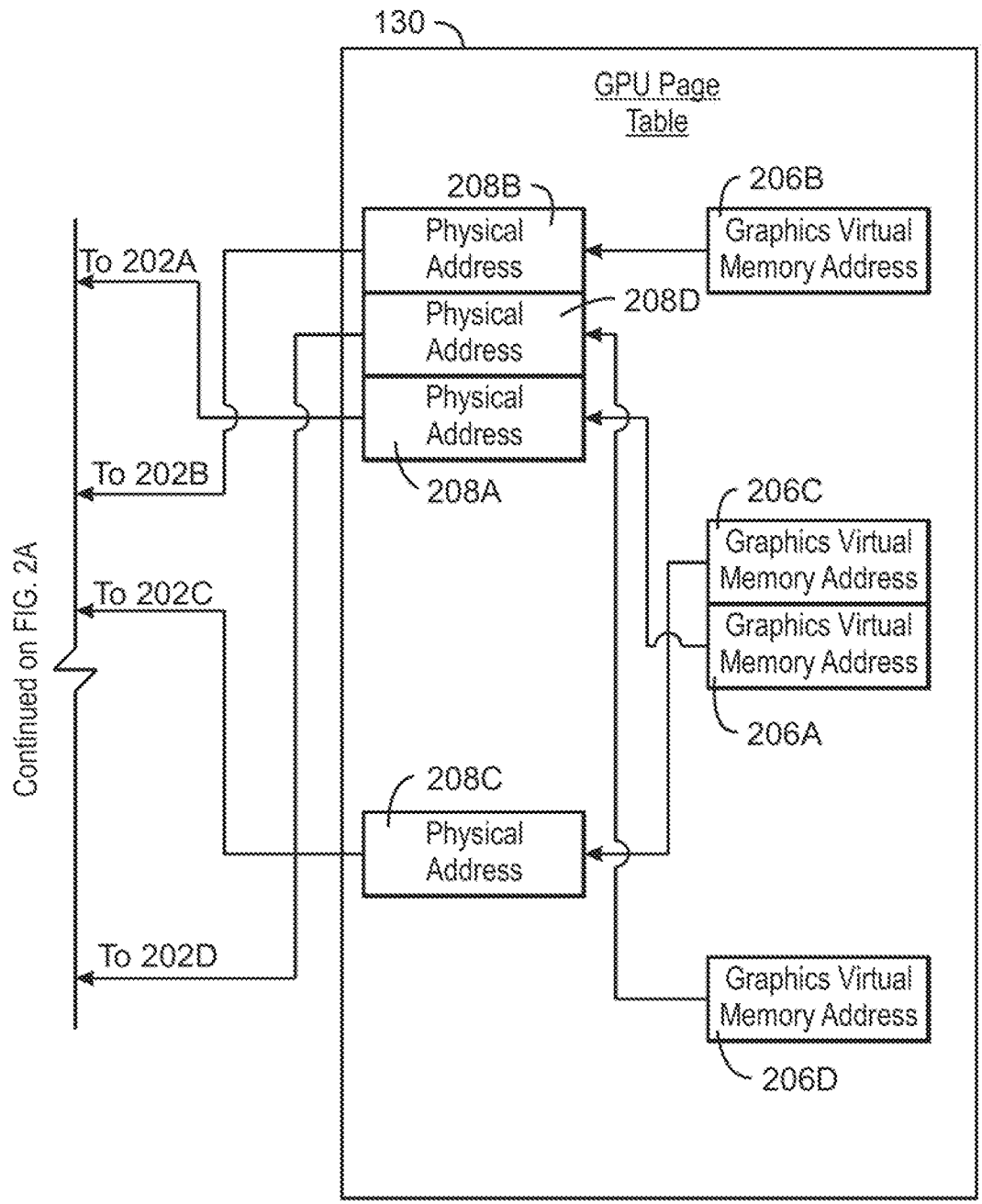

FIGS. 2A and 2B are a schematic of a unified memory architecture 200 that may be used to implement a procedure for sharing memory between the CPU 102 and the GPU 104 of the computing device 100, in accordance with embodiments. Like numbered items are as described with respect to FIG. 1. The UMA 200 may include, for example, the CPU page table 128, the GPU page table 130, and the surface 122 of the computing device 100.

The UMA 200 may enable direct memory sharing between the CPU 102 and the GPU 104 without any type of data copying or data transfer between the CPU 102 and the GPU 104. This may be accomplished by allowing the CPU 102 and the GPU 104 to share the surface 122. As described above, the surface 122 may be a portion of a physical storage device. The surface includes any number of physical memory locations 202. The physical memory locations 202 may be organized into a paged memory format, where a page is a fixed-length block of physical memory within the surface 122.

The CPU page table 128 may include a number of CPU virtual memory addresses 204, and the GPU page table 130 may include a number of graphics virtual memory addresses 206. The CPU virtual memory addresses 204 form the CPU virtual address space, while the graphics virtual memory addresses 206 form the graphics virtual address space. Each address space is mapped to a physical address in each page table. Thus, the CPU virtual memory addresses 204 and the graphics virtual memory addresses 206 both map to the same set of physical addresses 208 within the CPU page table 128 and the GPU page table 130, respectively.

The physical addresses 208 enable the CPU 102 and the GPU 104 (FIG. 1) to process data stored at physical locations 202 within the surface 122. In various embodiments, the surface 122 is allocated based on the specific CPU virtual addresses 204 accessed by an application, such as an application 124 (FIG. 1). Once the surface 122 has been allocated, each physical address 208 is mapped to a corresponding CPU virtual address 204 within the CPU page table 128, as shown in FIG. 2. The graphics virtual memory addresses 206 within the GPU page table 130 may be synchronized with the CPU page table 128, such that the CPU virtual addresses and the GPU virtual memory addresses are mapped to the same set of physical addresses 208. The physical addresses 208 correspond to physical locations 202 within the surface 122. Accordingly, the surface 122 may be directly shared between the CPU 102 and the GPU 104. In embodiments, if the GPU 104 modifies data located at any of physical locations 202, the modifications are automatically visible to the CPU 102 via the surface 122 without any data copying or data marshaling.

The schematic of FIG. 2 is not intended to indicate that the UMA 200 is to include all of the components shown in FIG. 2. Further, the UMA 200 may include any number of additional components not shown in FIG. 2, depending on the details of the specific implementation.

Figure 3:
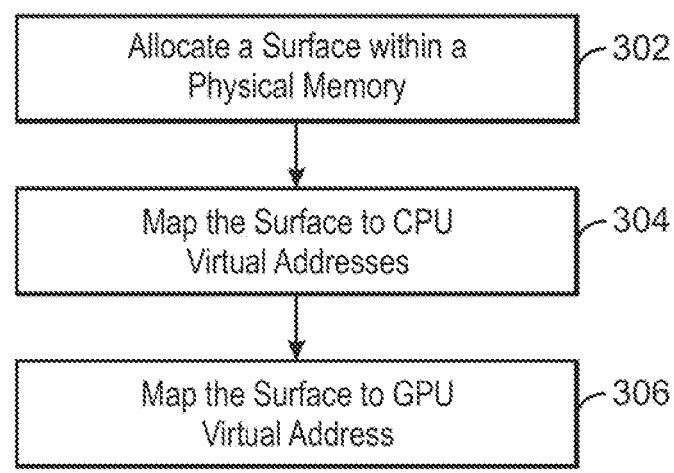
FIG. 3 is a process flow diagram showing a method for sharing memory between the CPU and the GPU of a computing device, in accordance with embodiments.

FIG. 3 is a process flow diagram showing a method 300 for sharing memory between the CPU and the GPU of a computing device, in accordance with embodiments. In various embodiments, the method 300 is used to share memory between the CPU and the GPU without copying data from a CPU memory to a GPU memory.

In some embodiments, the method 300 may be executed on a computing device, such as the computing device 100 where the CPU 102 and the GPU 104 are connected by a bus 106. In other embodiments, the CPU 102 and the GPU 104 may be included in a UMA, such as the UMA 200 discussed above with respect to FIG. 2. Further, the method 300 may executed by a driver of the computing device, such as the device driver 126 of the computing device 100.

The method begins at block 302 with the allocation of a surface within a physical memory. In embodiments, the surface may be allocated within the physical memory of a computing device in response to input from an application running on the CPU of the computing device. Furthermore, in embodiments, the surface may be allocated by the device driver. The application or the device driver may access the surface from the CPU using a CPU virtual address. In embodiments, the CPU virtual addresses are provided to the application or the device driver by an operating system of the computing device.

At block 304, the physical addresses corresponding to physical locations within the surface are mapped to the CPU virtual addresses. The mapping between the CPU virtual memory addresses and the physical addresses are included within a CPU page table. Mapping the physical memory pages to the virtual memory addresses may include translating the CPU virtual addresses to determine corresponding physical memory pages within the system memory. When the CPU virtual addresses have been translated to physical addresses, the associations between the CPU virtual addresses and the physical addresses found during the translation process are locked. By locking the associations, the physical locations of the surface that correspond to the physical addresses in the CPU page table may be paged in to the cache. The pages will remain in the cache while the associations are locked, as the physical addresses of the surface are prevented from changing by the device driver.

At block 306, the GPU virtual memory addresses are mapped to the physical locations within the surface. In embodiments, the surface is designated as LLC cacheable. Such a designation ensures that the physical locations of the surface are cached into the LLC which is shared by the CPU and the GPU. The graphics virtual memory addresses used by the application may be translated to the same physical addresses that are mapped to the virtual addresses of the CPU. In embodiments, the device driver may update the mapping of graphics virtual memory addresses to the physical addresses within the GPU page table.

Mapping the surface to the GPU virtual addresses may include pinning the surface. By pinning the surface, the mapping between the GPU virtual addresses and the surface are prevented from being changed. Thus, the GPU virtual memory will correspond to the same physical memory, without the physical memory being changed. For example, an operating system may change assigned physical memory locations as a part of its memory management. However, once the surface has been pinned, the operating system is prevented from changing the physical memory locations of the surface.

Figure 4:
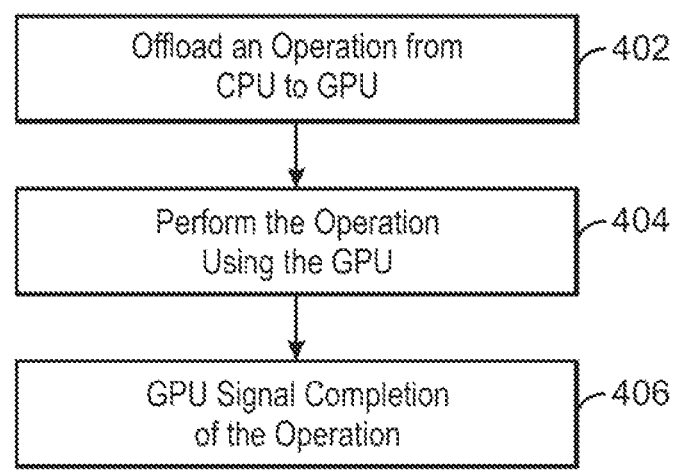
FIG. 4 is a process flow diagram showing a method for processing shared memory between the CPU and the GPU of a computing device, in accordance with embodiments.

FIG. 4 is a process flow diagram showing a method 400 for processing shared memory between the CPU and the GPU of a computing device, in accordance with embodiments.

At block 402, an operation may be offloaded from the CPU to the GPU. The operation may be offloaded to the GPU as directed by an application, such as the application 124 (FIG. 1). Additionally, any application programming interface (API) used to control the CPU or the GPU may be used to direct the offloading of an operation from the CPU to the GPU. In embodiments, prior to offloading an operation from the CPU to the GPU, the data located within the surface that is being processed by the CPU may be made coherent with the LLC.

At block 404, the GPU may begin processing of the offloaded operation. The GPU accesses data within the LLC and the surface in order to perform the operation. In the event that the GPU requests data that is not in the LLC but is in some other cache of the CPU, the LLC may retrieve the data from the other cache for processing by the GPU.

At block 406, the GPU signals that the operation is complete. The completion signal may be sent to the host. In embodiments, when the operation is complete, the device driver synchronizes the operation between the GPU and the CPU. Further, in embodiments, the completion signal may be, for example, a mailbox write or an interrupt. The completion signal may indicate that the GPU has performed some computation or graphics operation that has resulted in a modification of the data within the surface. After completion, the output of the GPU may be processed by the CPU. In various embodiments, when the GPU processes the surface by reading from or writing to any of the physical locations of the surface, processing may occur in internal buffers and caches of the GPU. Accordingly, the data within the internal buffers and caches of the GPU is made coherent with the LLC after the GPU processing has completed.

The process flow diagram of FIGS. 3 and 4 are not intended to indicate that the blocks of methods 300 and 400 are to be executed in any particular order, or that all of the blocks are to be included in every case. Further, any number of additional blocks may be included within the methods 300 and 400, depending on the details of the specific implementation. Additionally, while the methods described herein include a GPU, the memory may be shared between any I/O device such as another CPU or a direct memory access (DMA) controller.

Figure 5:
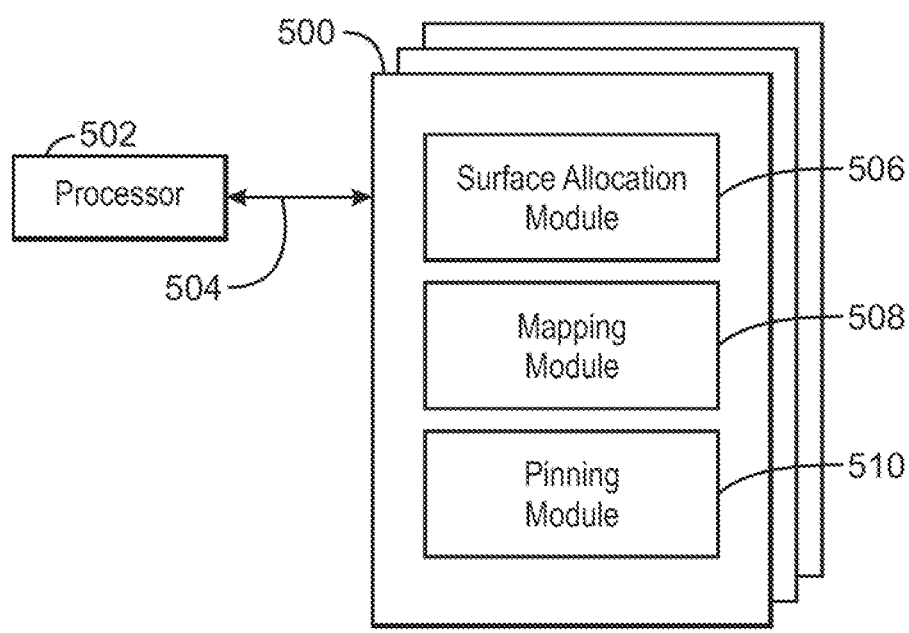
FIG. 5 is a block diagram showing tangible, non-transitory, computer-readable media that stores code for sharing memory between the CPU and the GPU of a computing device, in accordance with embodiments.

FIG. 5 is a block diagram showing tangible, non-transitory computer-readable media 500 that stores code for sharing memory between the CPU and the GPU of a computing device, in accordance with embodiments. The tangible, non-transitory computer-readable media 500 may be accessed by a processor 502 over a computer bus 504. Furthermore, the tangible, non-transitory computer-readable media 500 may include code configured to direct the processor 502 to perform the methods described herein.

The various software components discussed herein may be stored on the tangible, non-transitory computer-readable media 500, as indicated in FIG. 5. For example, a surface allocation module 506 may be configured to allocate or generate a surface including a number of physical memory pages within a memory of the computing device. A mapping module 508 may be configured to map the physical locations within the surface to virtual memory addresses within the CPU address table and GPU address table. Further, a pinning module 510 may be configured to pin the surface so that the physical locations within the surface are prevented from changing.

The block diagram of FIG. 5 is not intended to indicate that the tangible, non-transitory computer-readable media 500 is to include all of the components shown in FIG. 5. Further, the tangible, non-transitory computer-readable media 500 may include any number of additional components not shown in FIG. 5, depending on the details of the specific implementation.

In embodiments, the CPU does not have to marshal data between the CPU address space and the GPU address space. Furthermore, the CPU is not tasked with ensuring that no other processing cores are working on the particular set of data that the CPU wants the GPU to handle, thus preventing processing races between processing cores.

Figure 6:
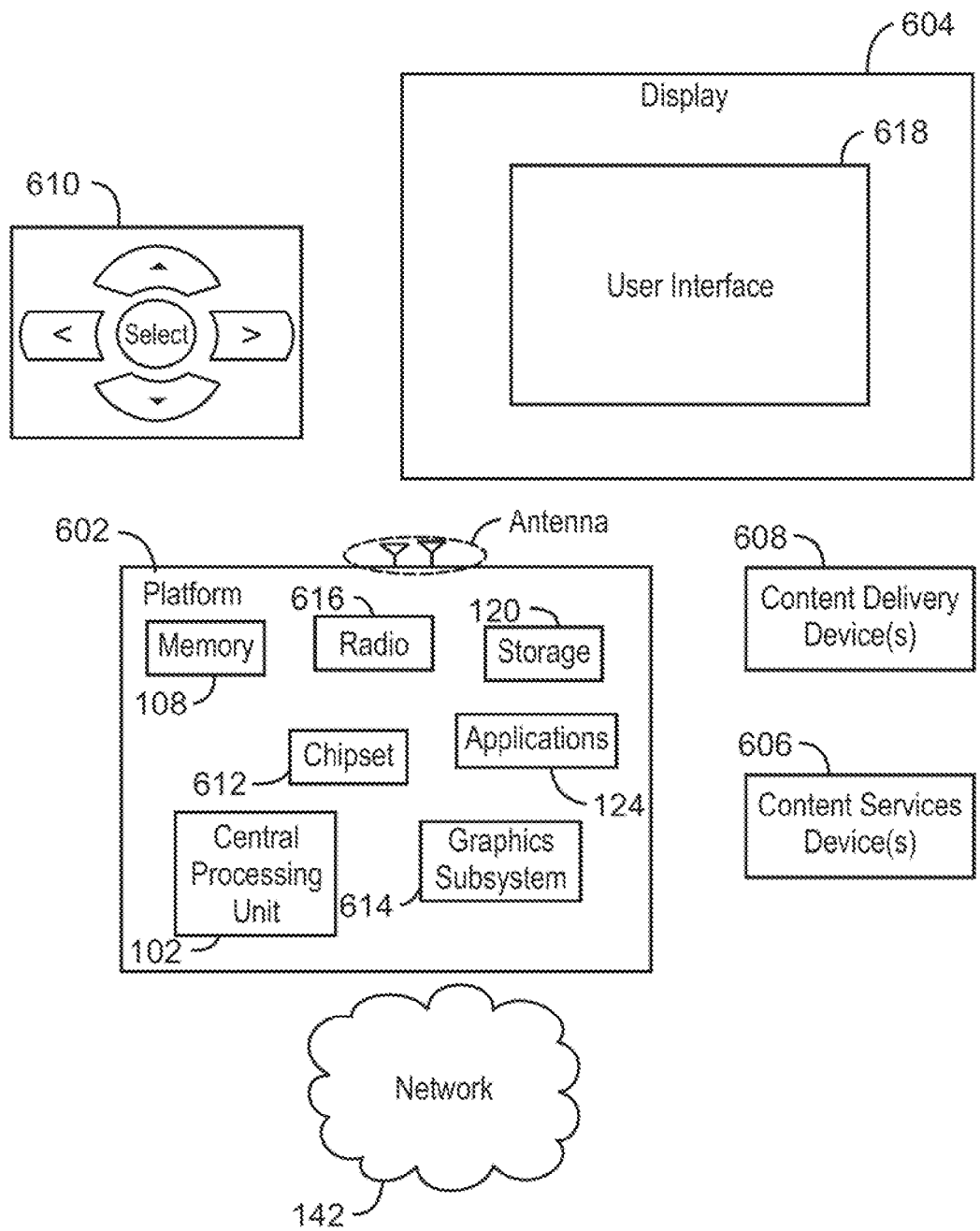
FIG. 6 is a block diagram of an exemplary system for implementing shared physical memory.

FIG. 6 is a block diagram of an exemplary system 600 for implementing shared physical memory. Like numbered items are as described with respect to FIGS. 1, 2A, and 2B. In some embodiments, the system 600 is a media system. In addition, the system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, or the like.

In various embodiments, the system 600 comprises a platform 602 coupled to a display 604. The platform 602 may receive content from a content device, such as content services device(s) 606 or content delivery device(s) 608, or other similar content sources. A navigation controller 610 including one or more navigation features may be used to interact with, for example, the platform 602 and/or the display 604. Each of these components is described in more detail below.

The platform 602 may include any combination of a chipset 612, a central processing unit (CPU) 102, a memory device 108, a storage device 120, a graphics subsystem 614, applications 124, and a radio 616. The chipset 612 may provide intercommunication among the CPU 102, the memory device 108, the storage device 120, the graphics subsystem 614, the applications 124, and the radio 614. For example, the chipset 612 may include a storage adapter (not shown) capable of providing intercommunication with the storage device 120.

The CPU 102 may be implemented as Complex Instruction Set Computer (CISC) or Reduced Instruction Set Computer (RISC) processors, x86 instruction set compatible processors, multi-core, or any other microprocessor or central processing unit (CPU). In some embodiments, the CPU 102 includes dual-core processor(s), dual-core mobile processor(s), or the like.

The memory device 108 may be implemented as a volatile memory device such as, but not limited to, a Random Access Memory (RAM), Dynamic Random Access Memory (DRAM), or Static RAM (SRAM). The storage device 120 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, the storage device 120 includes technology to increase the storage performance enhanced protection for valuable digital media when multiple hard drives are included, for example.

The graphics subsystem 614 may perform processing of images such as still or video for display. The graphics subsystem 614 may include a graphics processing unit (GPU), such as the GPU 104, or a visual processing unit (VPU), for example. An analog or digital interface may be used to communicatively couple the graphics subsystem 614 and the display 604. For example, the interface may be any of a High-Definition Multimedia Interface, DisplayPort, wireless HDMI, and/or wireless HD compliant techniques. The graphics subsystem 614 may be integrated into the CPU 102 or the chipset 612. Alternatively, the graphics subsystem 614 may be a stand-alone card communicatively coupled to the chipset 612.

The graphics and/or video processing techniques described herein may be implemented in various hardware architectures. For example, graphics and/or video functionality may be integrated within the chipset 612. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 616 may include one or more radios capable of transmitting and receiving signals using various suitable wireless communications techniques. Such techniques may involve communications across one or more wireless networks. Exemplary wireless networks include wireless local area networks (WLANs), wireless personal area networks (WPANs), wireless metropolitan area network (WMANs), cellular networks, satellite networks, or the like. In communicating across such networks, the radio 616 may operate in accordance with one or more applicable standards in any version.

The display 604 may include any television type monitor or display. For example, the display 604 may include a computer display screen, touch screen display, video monitor, television, or the like. The display 604 may be digital and/or analog. In some embodiments, the display 604 is a holographic display. Also, the display 604 may be a transparent surface that may receive a visual projection. Such projections may convey various forms of information, images, objects, or the like. For example, such projections may be a visual overlay for a mobile augmented reality (MAR) application. Under the control of one or more applications 124, the platform 602 may display a user interface 618 on the display 604.

The content services device(s) 606 may be hosted by any national, international, or independent service and, thus, may be accessible to the platform 602 via the Internet, for example. The content services device(s) 606 may be coupled to the platform 602 and/or to the display 604. The platform 602 and/or the content services device(s) 606 may be coupled to a network 142 to communicate (e.g., send and/or receive) media information to and from the network 142. The content delivery device(s) 608 also may be coupled to the platform 602 and/or to the display 604.

The content services device(s) 606 may include a cable television box, personal computer, network, telephone, or Internet-enabled device capable of delivering digital information. In addition, the content services device(s) 606 may include any other similar devices capable of unidirectionally or bidirectionally communicating content between content providers and the platform 602 or the display 604, via the network 142 or directly. It will be appreciated that the content may be communicated unidirectionally and/or bidirectionally to and from any one of the components in the system 600 and a content provider via the network 142. Examples of content may include any media information including, for example, video, music, medical and gaming information, and so forth.

The content services device(s) 606 may receive content such as cable television programming including media information, digital information, or other content. Examples of content providers may include any cable or satellite television or radio or Internet content providers, among others.

In some embodiments, the platform 602 receives control signals from the navigation controller 610, which includes one or more navigation features. The navigation features of the navigation controller 610 may be used to interact with the user interface 618, for example. The navigation controller 610 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures. Physical gestures include but are not limited to facial expressions, facial movements, movement of various limbs, body movements, body language or any combination thereof. Such physical gestures can be recognized and translated into commands or instructions.

Movements of the navigation features of the navigation controller 610 may be echoed on the display 604 by movements of a pointer, cursor, focus ring, or other visual indicators displayed on the display 604. For example, under the control of the applications 124, the navigation features located on the navigation controller 610 may be mapped to virtual navigation features displayed on the user interface 618. In some embodiments, the navigation controller 610 may not be a separate component but, rather, may be integrated into the platform 602 and/or the display 604.

The system 600 may include drivers (not shown) that include technology to enable users to instantly turn on and off the platform 602 with the touch of a button after initial boot-up, when enabled, for example. Program logic may allow the platform 602 to stream content to media adaptors or other content services device(s) 606 or content delivery device(s) 608 when the platform is turned "off." In addition, the chipset 612 may include hardware and/or software support for 5.1 surround sound audio and/or high definition 7.1 surround sound audio, for example. The drivers may include a graphics driver for integrated graphics platforms. In some embodiments, the graphics driver includes a peripheral component interconnect express (PCIe) graphics card.

In various embodiments, any one or more of the components shown in the system 600 may be integrated. For example, the platform 602 and the content services device(s) 606 may be integrated; the platform 602 and the content delivery device(s) 608 may be integrated; or the platform 602, the content services device(s) 606, and the content delivery device(s) 608 may be integrated. In some embodiments, the platform 602 and the display 604 are an integrated unit. The display 604 and the content service device(s) 606 may be integrated, or the display 604 and the content delivery device(s) 608 may be integrated, for example.

The system 600 may be implemented as a wireless system or a wired system. When implemented as a wireless system, the system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum. When implemented as a wired system, the system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, or the like. Examples of wired communications media may include a wire, cable, metal leads, printed circuit board (PCB), backplane, switch fabric, semiconductor material, twisted-pair wire, co-axial cable, fiber optics, or the like.

The platform 602 may establish one or more logical or physical channels to communicate information. The information may include media information and control information. Media information may refer to any data representing content meant for a user. Examples of content may include, for example, data from a voice conversation, videoconference, streaming video, electronic mail (email) message, voice mail message, alphanumeric symbols, graphics, image, video, text, and the like. Data from a voice conversation may be, for example, speech information, silence periods, background noise, comfort noise, tones, and the like. Control information may refer to any data representing commands, instructions or control words meant for an automated system. For example, control information may be used to route media information through a system, or instruct a node to process the media information in a predetermined manner. The embodiments, however, are not limited to the elements or the context shown or described in FIG. 6.

Figure 7:
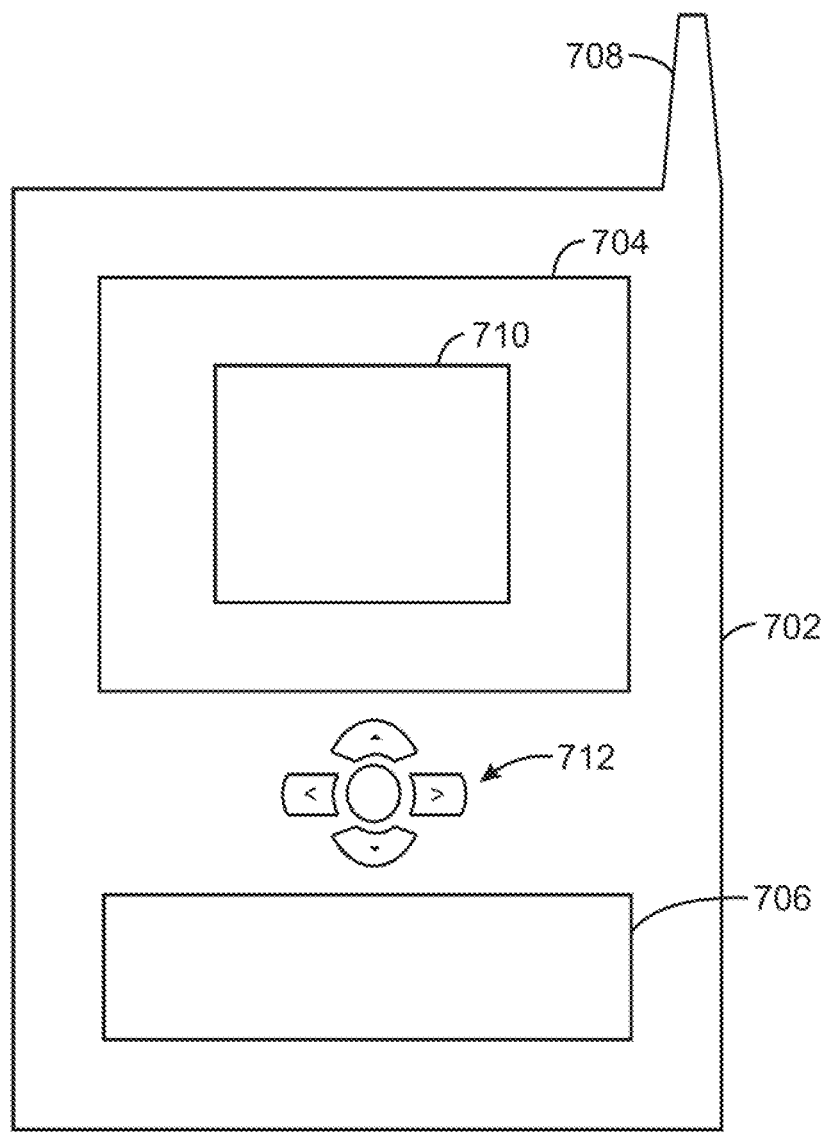
FIG. 7 is a schematic of a small form factor device in which the system of FIG. 6 may be embodied.

FIG. 7 is a schematic of a small form factor device 700 in which the system 600 of FIG. 6 may be embodied. Like numbered items are as described with respect to FIG. 6. In some embodiments, for example, the device 700 is implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and the like.

An example of a mobile computing device may also include a computer that is arranged to be worn by a person, such as a wrist computer, finger computer, ring computer, eyeglass computer, belt-clip computer, arm-band computer, shoe computer, clothing computer, or any other suitable type of wearable computer. For example, the mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well.

As shown in FIG. 7, the device 700 may include a housing 702, a display 704, an input/output (I/O) device 706, and an antenna 708. The device 700 may also include navigation features 710. The display 704 may include any suitable display unit for displaying information appropriate for a mobile computing device. The I/O device 706 may include any suitable I/O device for entering information into a mobile computing device. For example, the I/O device 706 may include an alphanumeric keyboard, a numeric keypad, a touch pad, input keys, buttons, switches, rocker switches, microphones, speakers, a voice recognition device and software, or the like. Information may also be entered into the device 700 by way of microphone. Such information may be digitized by a voice recognition device.

EXAMPLE 1

A method for sharing memory between a central processing unit (CPU) and an input/output (I/O) device of a computing device is described herein. The method includes allocating a surface within a physical memory. The method includes mapping the surface to a plurality of virtual memory addresses within a CPU page table. The method also includes mapping the surface to a plurality of graphics virtual memory addresses within an I/O device page table based on the surface. The method further includes pinning the surface.

Memory may be shared between the CPU and the I/O device via the surface without copying data from a CPU memory to an I/O device memory. The surface may be allocated in response to input from an application running on the CPU of the computing device. In addition, the method may be executed by a driver of the computing device.

Data from the cache of the CPU and the I/O device may be coherent with a last level cache (LLC) that is shared between the CPU and the I/O device. An operation may be offloaded from the CPU to the I/O device, and the operation may be performed within the I/O device. A completion signal may be sent to the CPU, wherein the completion signal includes an indication that the I/O device has performed some computation that has resulted in a modification of data within the surface. Additionally, a device driver may synchronize the processing of data between the CPU and the I/O device.

EXAMPLE 2

A computing device is described herein. The computing device includes a central processing unit (CPU) that is configured to execute stored instructions and a storage device that stores instructions. The storage device includes processor executable code that, when executed by the CPU, is configured to allocate a surface within a physical memory. The computing device also includes a graphics processing unit (GPU) and GPU page table. The surface may be mapped to a plurality of virtual memory addresses within a CPU page table. The surface may also be mapped to a plurality of virtual memory addresses within the GPU page table. The computing device may pin the surface.

The physical memory may be shared between the CPU and the GPU without copying data from a CPU memory to a GPU memory. Further, the CPU and the GPU are located on a same die within the computing device. The CPU and the GPU may share a last level cache (LLC), wherein the LLC can retrieve data from any cache of the CPU or GPU. The CPU and the GPU may include a unified memory architecture (UMA).

The processor executable code may be configured to allocate the surface in response to input from an application running on the CPU of the computing device. The virtual memory addresses in the CPU page table and the GPU page table may be mapped to physical locations within the surface by translating the virtual addresses to physical addresses. A driver may be configured to initiate execution of the processor executable code. Additionally, the computing device may include a radio and a display, and the radio and display may be communicatively coupled at least to the central processing unit.

EXAMPLE 3

At least one non-transitory machine readable medium having instructions stored therein is described herein. In response to being executed on a computing device, the instructions cause the computing device to generate a surface within a physical memory. The instructions also cause the computing device to map the surface to a number of CPU virtual memory addresses, and map the surface to a number of GPU virtual memory addresses. The surface may also be pinned.

The physical memory may be shared between the CPU and the GPU without copying data from a CPU memory to a GPU memory. Further, the instructions may cause the data from the cache of the CPU and the GPU to be coherent with a last level cache (LLC). In addition, the instructions may also cause the computing device to allocate the surface in response to input from an application running on a CPU of the computing device.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A computing device comprising:
a central processing unit (CPU);
a graphics processing unit (GPU) coupled to the CPU, the CPU and the GPU on a same die, wherein the one of the CPU or the GPU is a graphics processor; and
wherein the CPU is to allocate a surface within physical memory, the surface to be directly shared between the CPU and the GPU and data on the surface is to be automatically visible without copying data, the CPU to map the surface to a plurality of virtual memory addresses within an address space of the CPU and map the surface to a plurality of virtual memory addresses within an address space of the GPU.

2. The computing device as in claim 1, wherein the CPU is to access the data from a first virtual memory address and the GPU is to access the data from a second virtual memory address, the first and second virtual memory address mapped to the surface.

3. The computing device as in claim 1, additionally comprising at least one memory management unit (MMU) coupled to one of the CPU, the GPU, or the first and GPU, the MMU to manage a mapping of a set of physical memory addresses for data allocated in physical memory to a set of virtual memory addresses for one of the CPU, the GPU, or the first and GPU.

4. The computing device as in claim 3, wherein the at least one MMU includes one or more mappings to a first page table associated with the CPU and a second page table associated with the GPU.

5. The computing device as in claim 4, wherein the CPU is to map the surface to a plurality of virtual memory addresses in the first page table and map the surface to a plurality of virtual memory addresses in the second page table.

6. A computing system comprising:
a central processing unit (CPU);
a graphics processing unit (GPU) coupled to the CPU, the CPU and the GPU on a same die, wherein the one of the CPU or the GPU is a graphics processor;
a display device to display output data; and
a storage device to store instructions which, when executed, causes one of the CPU, the GPU, or the first and GPU to:
allocate a surface within physical memory, the surface to be directly shared between the CPU and the GPU and data on the surface is to be automatically visible without copying data;
map the surface to a plurality of virtual memory addresses within an address space of the CPU; and
map the surface to a plurality of virtual memory addresses within an address space of the GPU.

7. The computing system as in claim 6, wherein the CPU is to access the data from a first virtual memory address and the GPU is to access the data from a second virtual memory address, the first and second virtual memory address mapped to the surface.

8. The computing system as in claim 6, additionally comprising at least one memory management unit (MMU) coupled to one of the CPU, the GPU, or the first and GPU, the MMU to manage a mapping of a set of physical memory addresses for data allocated in physical memory to a set of virtual memory addresses for one of the CPU, the GPU, or the first and GPU.

9. The computing system as in claim 8, wherein the at least one MMU includes one or more mappings to memory including a first page table associated with the CPU and a second page table associated with the GPU.

10. The computing system as in claim 9, wherein the instructions on the storage device are to configure the CPU or the GPU to map the surface to a plurality of virtual memory addresses in the first page table and map the surface to a plurality of virtual memory addresses in the second page table.

11. A non-transitory machine-readable medium storing instructions which, when executed by one or more processors of a computing device, cause the one or more processors to perform operations to:
allocate a surface within memory associated with the computing device, the surface to be directly shared between a central processing unit (CPU) and a graphics processing unit (GPU) of the computing device and data on the surface is to be automatically visible without copying data from memory of the CPU to memory of the GPU, wherein one of the CPU or the GPU is a graphics processor;
map the surface to a plurality of virtual memory addresses within an address space of the CPU; and
map the surface to a plurality of virtual memory addresses within an address space of the GPU.

12. The non-transitory machine-readable medium as in claim 11, wherein the one or more processors includes the CPU and the GPU and physical memory is shared between the CPU and the GPU without copying data in shared memory.

13. The non-transitory machine-readable medium as in claim 12, the instructions to cause the CPU to access the data from a first virtual memory address and the GPU to access the data from a second virtual memory address, the first and second virtual memory address mapped to the surface.

14. The non-transitory machine-readable medium as in claim 13, the instructions to cause the one or more processors to map a first page table associated with the CPU and a second page table associated with the GPU to one or more memory management units (MMU).

15. The non-transitory machine-readable medium as in claim 14, the instructions to cause the one or more processors to map the surface to a plurality of virtual memory addresses in the first page table and map the surface to a plurality of virtual memory addresses in the second page table.

16. A method for sharing memory between multiple processors of a computing device, the method comprising:
allocating a surface within memory associated with the computing device, the surface directly shared between a central processing unit (CPU) and a graphics processing unit (GPU) of the computing device and data on the surface is automatically visible without copying data from memory of the CPU to memory of the GPU, wherein one of the CPU or the GPU is a graphics processor;
mapping the surface to a plurality of virtual memory addresses within an address space of the CPU; and mapping the surface to a plurality of virtual memory addresses within an address space of the GPU.

17. The method as in claim 16, additionally comprising:
mapping a first page table associated with the CPU and a second page table associated with the GPU to one or more memory management units (MMU).

18. The method as in claim 17, additionally comprising:
translating a first set of virtual memory addresses within the first page table to physical addresses;
translating a second set of virtual memory addresses within the second page table to physical addresses; and
mapping the first set of memory addresses and the second set of memory addresses to physical address within the surface.

19. The method as in claim 18, additionally comprising:
accessing data with the CPU from a first virtual memory address; and
accessing data with the GPU from a second virtual memory address, wherein each of the first virtual memory address and the second virtual memory address is mapped to the surface.

20. A computing device comprising:
means for allocating a surface, the surface directly shared between a central processing unit (CPU) and a graphics processing unit (GPU) and data on the surface is automatically visible without copying data from memory of the CPU to memory of the GPU, wherein one of the CPU or the GPU is a graphics processor;
means for mapping the surface to a plurality of virtual memory addresses within an address space of the CPU; and
mean for mapping the surface to a plurality of virtual memory addresses within an address space of the GPU.

21. The computing device as in claim 20, additionally comprising:
means for mapping a first page table associated with the CPU and a second page table associated with the GPU to one or more memory management units (MMU).

22. The computing device as in claim 21, additionally comprising:
means for translating a first set of virtual memory addresses within the first page table to physical addresses;
means for translating a second set of virtual memory addresses within the second page table to physical addresses; and
means for mapping the first set of memory addresses and the second set of memory addresses to physical address within the surface.

23. The computing device as in claim 22, additionally comprising:
means for accessing data with the CPU from a first virtual memory address; and
means for accessing data with the GPU from a second virtual memory address, wherein each of the first virtual memory address and the second virtual memory address is mapped to the surface.

* * * * *